US012423941B2

(12) United States Patent
Yamauchi et al.

(10) Patent No.: US 12,423,941 B2
(45) Date of Patent: Sep. 23, 2025

(54) IMAGE RECOGNITION SYSTEM

(71) Applicant: Hitachi High-Tech Corporation, Tokyo (JP)

(72) Inventors: Toshinori Yamauchi, Tokyo (JP); Masayoshi Ishikawa, Tokyo (JP); Takefumi Kakinuma, Tokyo (JP); Masaki Hasegawa, Tokyo (JP); Kentaro Ohira, Tokyo (JP); Yasutaka Toyoda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 570 days.

(21) Appl. No.: 17/740,825

(22) Filed: May 10, 2022

(65) Prior Publication Data
US 2022/0392187 A1 Dec. 8, 2022

(30) Foreign Application Priority Data

Jun. 7, 2021 (JP) ................ 2021-094877

(51) Int. Cl.
G06V 10/20 (2022.01)
G06V 10/44 (2022.01)
G06V 10/46 (2022.01)
(52) U.S. Cl.
CPC .......... G06V 10/255 (2022.01); G06V 10/454 (2022.01); G06V 10/476 (2022.01)

(58) Field of Classification Search
None
See application file for complete search history.

(56) References Cited

U.S. PATENT DOCUMENTS 10,964,004 B2  3/2021 Fang et al.
2017/0286774 A1* 10/2017 Gaidon .................. G06N 3/08

FOREIGN PATENT DOCUMENTS

JP   2013-077127 A   4/2013
TW   202104879 A    2/2021

OTHER PUBLICATIONS

Taiwan Office Action issued on Mar. 7, 2024 for Taiwan Patent Application No. 111118053.
Hsu, C., et al., "The Risk Analysis of Reservoir Water Supply under High Turbidity-Case Study of the Shihmen Reservoir", Abstract, American Geophysical Union, Fall Meeting, (2011).

* cited by examiner

Primary Examiner — Michelle M Koeth
(74) Attorney, Agent, or Firm — Volpe Koenig

(57) ABSTRACT

According to the present invention, an image recognition system calculates importance of a feature for each target shape recognized in an image and for each type of feature, and determines correctness of a recognition result by comparing the importance with a statistic for each type of feature, for each target shape.

11 Claims, 13 Drawing Sheets

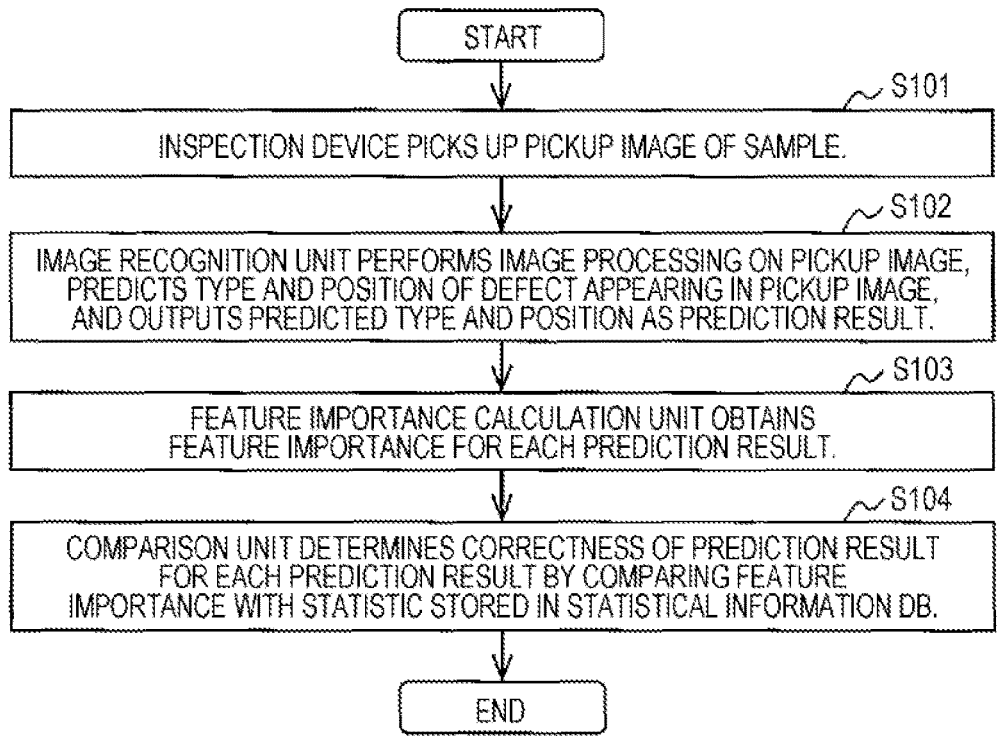
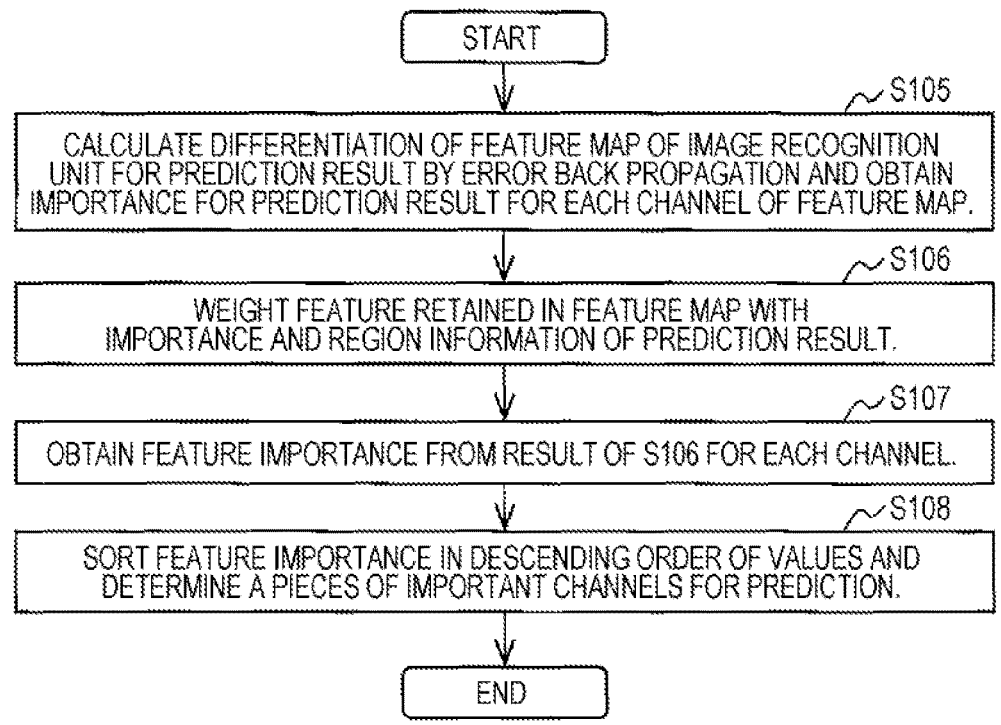

| RANK | CHANNEL NUMBER |
|---|---|
| 1 | 78 |
| 2 | 89 |
| : | : |
| A | 478 |

FIG. 8A

CLASS X

| RANK | CHANNEL NUMBER |
|---|---|
| 1 | 43 |
| 2 | 1 |
| : | : |
| B | 205 |

CLASS Y

| RANK | CHANNEL NUMBER |
|---|---|
| 1 | 33 |
| 2 | 177 |
| : | : |
| B | 20 |

CLASS X

| RANK | CHANNEL NUMBER |
|---|---|
| 1 | 46 |
| 2 | 43 |
| : | : |
| C | 1 |

CLASS Y

| RANK | CHANNEL NUMBER |
|---|---|
| 1 | 177 |
| 2 | 20 |
| : | : |
| C | 55 |

...

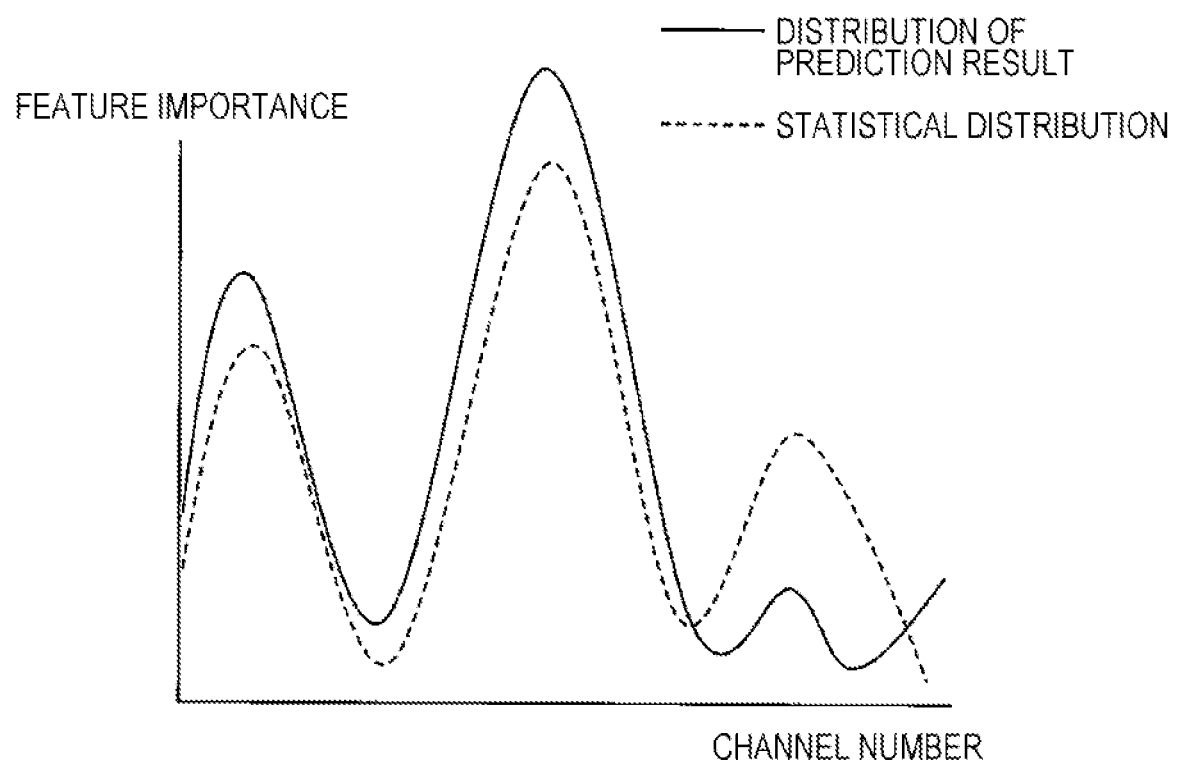

FIG. 13

| (1) EVALUATION DATA SELECTION PORTION | |
|---|---|
| EVALUATION DATA | XXX |
| EVALUATION MODEL | MODEL A, MODEL B, ... |
| EVALUATION DATE | YYYY |

(2) COMPARISON CONDITION SETTING PORTION

– COMPARISON TARGET: ESTIMATED CORRECT ANSWER RATE
– MODEL RELIABILITY: 0.3

(3) COMPARISON RESULT CONFIRMATION PORTION

– COMPARISON CLASS: ALL CLASSES

| | MODEL A | MODEL B | ... | MODEL N |
|---|---|---|---|---|
| ESTIMATED CORRECT ANSWER RATE | 70% | 57% | | 67% |

OPTIMUM MODEL: MODEL A

– COMPARISON CLASS: CLASS 1

| | MODEL A | MODEL B | ... | MODEL N |
|---|---|---|---|---|
| ESTIMATED CORRECT ANSWER RATE | 62% | 80% | | 70% |

OPTIMUM MODEL: MODEL B

⋮

FIG. 15
(1) PERIOD SELECTION PORTION
| MONITORING PERIOD | AA, BB, CC TO DD, EE, FF |
|---|---|
| MONITORING MODEL | MODEL A |
| SET NUMBER OF ERRONEOUS RECOGNITIONS | 100 |
| SET ERRONEOUS RECOGNITION RATE | 40 % |
(2) MONITORING RESULT CONFIRMATION PORTION
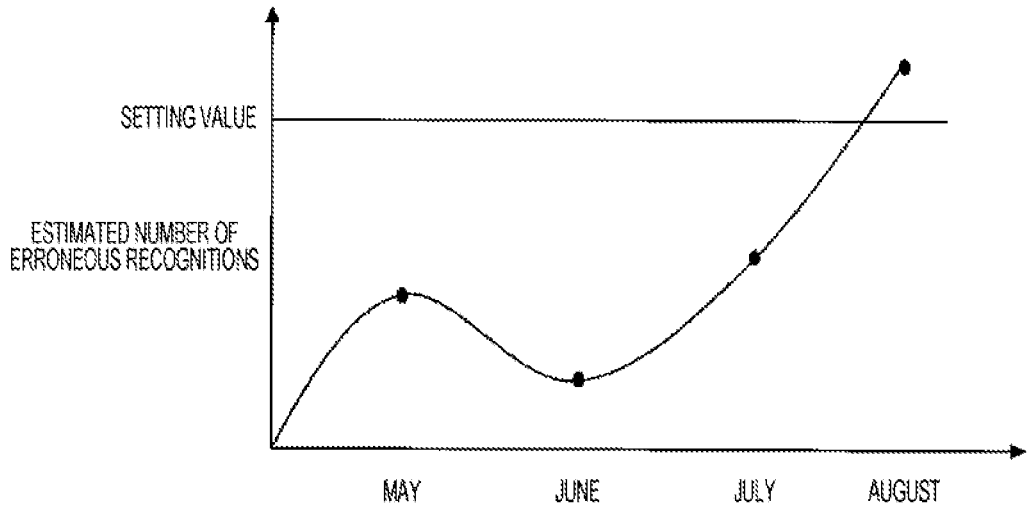
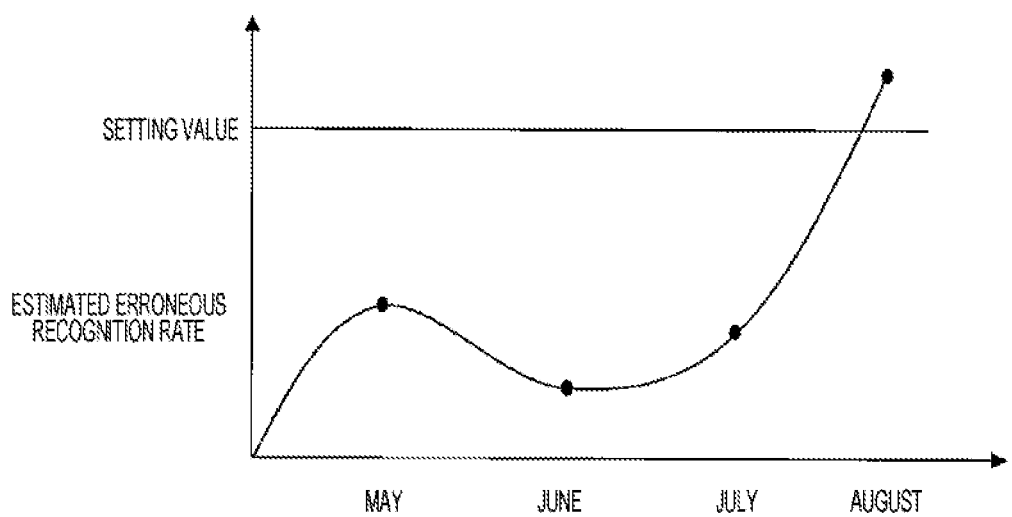

IMAGE RECOGNITION SYSTEM

BACKGROUND OF THE INVENTION

1. Field of the Invention

The present invention relates to an image recognition system that recognizes a shape included in an image.

2. Description of the Related Art

In a manufacturing line of a semiconductor, a liquid crystal panel, or the like, if a defect occurs at the beginning of a process, the work of the subsequent process is wasted. Therefore, an inspection process is provided at each important point of the process, and manufacturing is advanced while checking and maintaining that a predetermined yield is obtained. In such an inspection process, for example, a critical dimension-SEM (CD-SEM) or a defect review SEM to which a scanning electron microscope (SEM) is applied is used.

In the inspection process, it is checked whether or not an image picked up by an inspection device has a defect or an abnormality. In recent years, an image recognition model constructed by machine learning enables highly accurate automatic inspection. However, the characteristics of a sample to be inspected vary depending on a manufacturing process. Thus, it is necessary to re-learn the image recognition model in a manufacturing site in order to maintain high inspection accuracy. In this case, it is necessary to perform performance comparison evaluation between the relearning model and the existing model and to check whether the relearning model is normally functioning. That is, the performance evaluation of the image recognition model is required. In general, the performance evaluation is performed by labeled data or check of a third party, but it is difficult to perform such performance evaluation in terms of cost, time, and the like in the manufacturing site. Therefore, it is necessary to automatically evaluate the performance of the model by unlabeled data.

As the related art of the present technical field, for example, there is a technique such as JP 2013-077127 A. JP 2013-077127 A discloses a technique as follows. An object of the technique is "to provide a technique capable of presenting information regarding the certainty of a classification result by a simple method in an image classification device and an image classification method for performing classification based on a feature of an image". In addition, "a defect image X classified into a category A by a certain classification algorithm is used as a calculation target, and reliability of a classification result is calculated. For each of a plurality of types of features V1 to V8, a range of a value of a typical image belonging to the above classification category is obtained as a typical range. The feature having a value within the typical range among the features representing the calculation target image X is voted, and a ratio of the number of votes to the number of types of features is output as the reliability" (see Abstract).

SUMMARY OF THE INVENTION

The technique of JP 2013-077127 A outputs the reliability representing the certainty of the classification result by the classification algorithm (image recognition model). As a result, it is possible to determine the correctness of the classification result of the image recognition model. Thus, it is considered that it is possible to automatically perform the performance evaluation of the model by the unlabeled data.

However, the image classification device in the related art as disclosed in JP 2013-077127 A calculates the feature for the entirety of one input image. In other words, even when there are a plurality of defects in the image, the feature for identifying all the plurality of detects is calculated. In a case where the feature for identifying all the plurality of defects is calculated, an aggregate of the plurality of defects is identified by the feature, and individual defects are not separately identified. Therefore, it is difficult to determine the correctness of a prediction result of each defect.

The present invention has been made in view of the above problems, and an object of the present invention is to provide a technique capable of determining correctness of individual prediction results of a plurality of shapes even when the shapes appear in an image in an image recognition system that recognizes the shape included in the image.

According to the present invention, an image recognition system calculates importance of a feature for each target shape recognized in an image and for each type of feature, and determines correctness of a recognition result by comparing the importance with a statistic for each type of feature, for each target shape.

According to the image recognition system according to the present invention, it is possible to determine correctness of individual prediction results of a plurality of shapes even when the shapes appear in an image, in an image recognition system that recognizes the shape included in the image. Objects, configurations, and advantageous effects other than those described above will be clarified by the descriptions of the following embodiments.

BRIEF DESCRIPTION OF THE DRAWINGS

FIG. 3 is a flowchart illustrating an operation of the image recognition system;

FIG. 4 is a flowchart illustrating processing of a feature importance calculation unit;

FIG. 8A illustrates an example of data stored in a feature importance database (DB) in S114;

FIG. 8B illustrates an example of data stored in a statistical information database (DB) in S116;

FIG. 9 is a diagram conceptually illustrating correctness determination of a prediction result by comparison of a distribution;

FIG. 13 illustrates an example of a GUI that displays a comparison result stored in a comparison result database (DB);

FIG. 15 illustrates an example of a GUI output by a display unit.

DESCRIPTION OF THE PREFERRED EMBODIMENTS

First Embodiment

Figure 1:
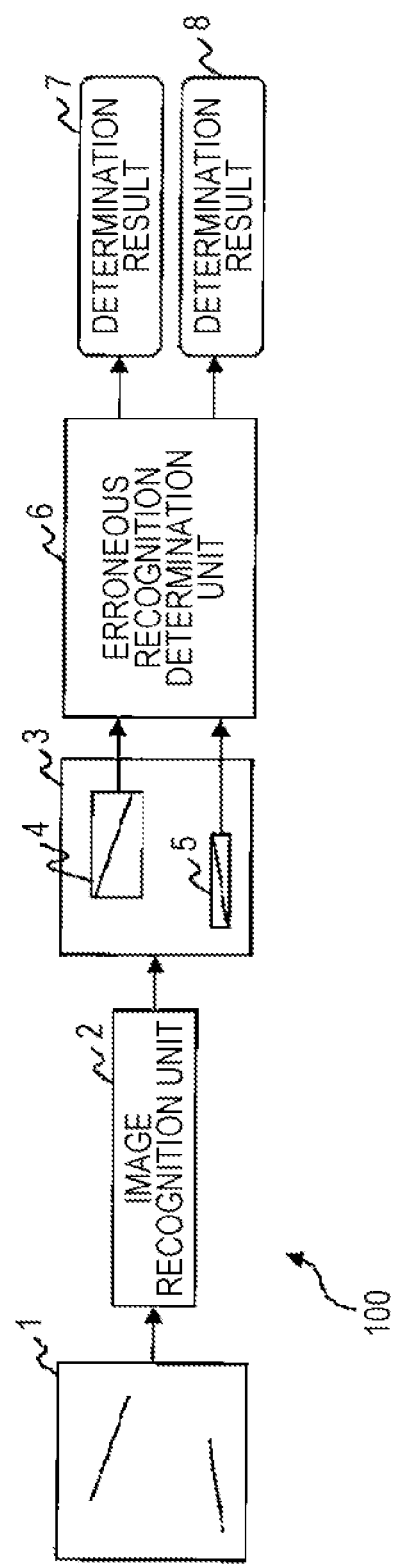
FIG. 1 is a diagram conceptually illustrating a configuration of an image recognition system according to a first embodiment.

FIG. 1 is a diagram conceptually illustrating a configuration of an image recognition system 100 according to a first embodiment of the present invention. The image recognition system 100 includes an image recognition unit 2, an erroneous recognition determination unit 6, and the like. The image recognition unit 2 acquires a prediction result 3 by performing prediction on a pickup image 1. The erroneous recognition determination unit 6 determines correctness of the prediction result 3.

As illustrated with the prediction result 3, the image recognition unit 2 individually predicts the type and the position of a defect appearing in the pickup image 1 as with a prediction result 4 and a prediction result 5. The erroneous recognition determination unit 6 uses the result predicted by the image recognition unit 2 as an input, and individually determines the correctness of the result. That is, the erroneous recognition determination unit 6 determines whether the type of defect predicted for each region of the predicted result is correct, and outputs a result for the prediction result 4 as a determination result 7 and outputs a result for the prediction result 5 as a determination result 8.

Figure 2:
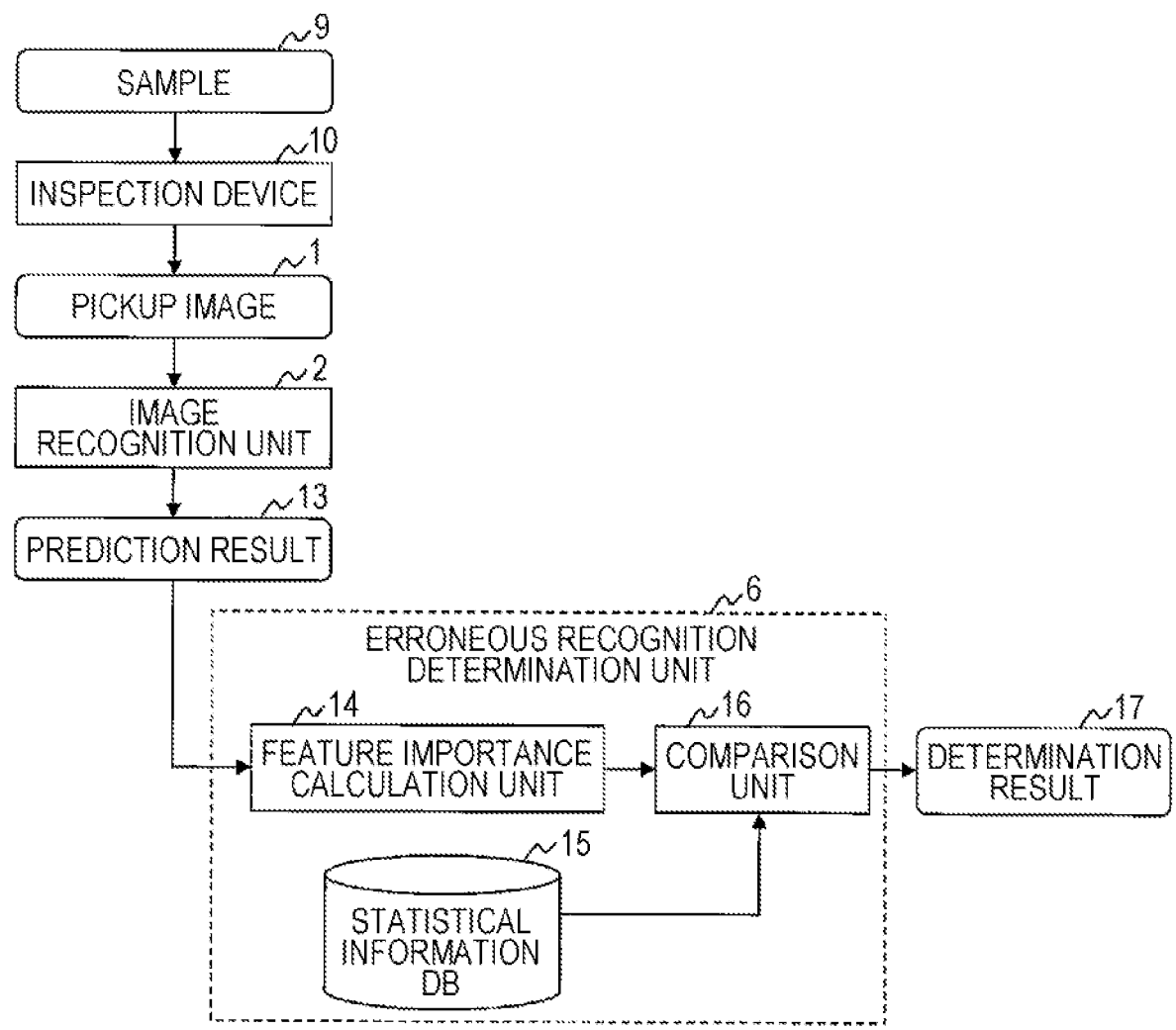
FIG. 2 is a block diagram illustrating the configuration of the image recognition system.

FIG. 2 is a block diagram illustrating the configuration of the image recognition system 100. A specific configuration for realizing the functions described with reference to FIG. 1 will be described with reference to FIG. 2.

An inspection device 10 picks up the pickup image 1 of a sample 9. The sample 9 is, for example, a semiconductor wafer. The inspection device 10 corresponds to, for example, a defect inspection device using a mirror electron microscope that forms an image of mirror electrons, an optical defect inspection device, or the like.

The image recognition unit 2 performs defect inspection on the acquired pickup image 1. The image recognition unit 2 extracts a feature from the pickup image 1, and detects a defect appearing in the pickup image 1 from the extracted feature. When a plurality of defects appear in the pickup image 1, the image recognition unit 2 individually predicts the defects. Thus, the image recognition unit 2 includes an image recognition model enabling prediction of the type and the position of the defect. As the image recognition model included in the image recognition unit 2, for example, a single shot multibox detector (SSD) configured by a convolution neural network (CNN), RetinaNet, or the like can be used.

The erroneous recognition determination unit 6 includes a feature importance calculation unit 14, a statistical information database (DB) 15, and a comparison unit 16. Details of processing contents of each constituent unit will be described later.

The feature importance calculation unit 14 uses the prediction result 13 as an input, and obtains feature importance from the prediction result 13. The feature importance represents the importance of the feature extracted by the image recognition unit 2 for the prediction result. A specific example of the importance will be described later.

The statistical information database (DB) 15 stores a statistic related to the feature importance obtained by the feature importance calculation unit 14.

The comparison unit 16 compares the feature importance obtained by the feature importance calculation unit 14 with the statistic stored in the statistical information database (DB) 15. When the feature importance obtained by the feature importance calculation unit 14 deviates from the statistic stored in the statistical information database (DB) 15, the comparison unit 16 determines that the prediction result 13 is erroneous and outputs the result as the determination result 17.

FIG. 3 is a flowchart illustrating an operation of the image recognition system 100. Each step in FIG. 3 will be described below.

In Step S101, the inspection device 10 picks up a pickup image 1 of a sample 9.

In Step S102, the image recognition unit 2 performs image processing on the pickup image 1 to predict the type and the position of a defect appearing in the pickup image 1, and output a prediction result 13.

In Step S103, the feature importance calculation unit 14 obtains feature importance for each prediction result.

In Step S104, the comparison unit 16 determines correctness of the prediction result for each prediction result by comparing the feature importance obtained by the feature importance calculation unit 14 with the statistic stored in the statistical information database (DB) 15.

Details of processing contents of each of the constituent units being the feature importance calculation unit 14, the statistical information database (DB) 15, and the comparison unit 16 constituting the erroneous recognition determination unit 6 will be described with reference to FIGS. 4 to 8.

FIG. 4 is a flowchart illustrating processing of the feature importance calculation unit 14. Each step in FIG. 4 will be described below.

In Step S105, the feature importance calculation unit 14 calculates the differentiation of a feature map of the image recognition unit 2 with respect to the prediction result, by using error back propagation. By using the differential value, the importance for the prediction result is obtained for each channel (type of feature) of the feature map. The feature map holds the feature extracted trap the pickup image 1. The process in Step S105 is shown in Math. 1.

$$\alpha_{k,c,box\_pre} = \frac{1}{z}\sum_{i}^{u}\sum_{j}^{v} \frac{\partial y_{c,box\_pre}}{\partial A_{i,j,k}} \quad \text{[Math. 1]}$$

In Math. 1, $y_{c,\ box\_pre}$ indicates a score for a class c (type of defect) predicted by the image recognition unit 2, and box_pre represents a predicted position. $A_{i,\ j,\ k}$ represent the feature map of the image recognition unit 2, i and j represent vertical and horizontal pixel numbers of the feature map, and k represents a channel number. u and v represent the numbers of vertical and horizontal pixels of the feature map, respectively. z is u×v. That is, with Step S105, the differentiation of the feature map with respect to the score value for the class c and the position of box_pre is calculated, and the average value is calculated for each channel. $\alpha_{k,\ c,\ box\_pre}$ obtained as a result represents the importance of the feature held by the feature map of the channel number k for the prediction result (the class is c, and the position is box_pre). The importance is obtained for each channel. Thus, for example, when the number of channels is 100, 100 pieces of importance are obtained. When a plurality of defects appear in the pickup image 1 and there are a plurality of prediction results, the importance is obtained for each prediction result. The importance represents the degree of influence of the type k of the feature on the recognition result.

In Step S106, the feature importance calculation unit 14 weights the feature held in the feature map with the importance obtained in Step S105 and region information of the prediction result. This process is shown in Math. 2. $S_{k, c, box\_pre}$ is region information of the prediction result and is obtained by Math. 3. $S_{k, c, box\_pre}$ represents the importance of a region for the prediction result (the class is c, and the position is box_pre.) in each pixel of the feature map having the channel number k. As the region information of the prediction result, a mask in which the inside of the region of the prediction result is set to 1 and the other regions are set to 0, a template region in which an important region is set in advance, or the like can also be used. When a plurality of defects appear in the pickup image 1, and there are a plurality of prediction results, the process of Math. 2 is performed on each prediction result. In Step S106, the feature importance calculation unit 14 may weight the feature held in the feature map only with the importance obtained in Step S105. $G_{k, c, box\_pre}$ or $S_{k, c, box\_pre}$ represents the degree of influence of the image region on the recognition result.

$$G_{k,c,box\_pre} = \alpha_{k,c,box\_pre} \cdot A_k \cdot S_{k,c,box\_pre} \quad \text{[Math. 2]}$$

$$S_{k,c,box\_pre} = \frac{\left|\frac{\partial y_{c,box\_pre}}{\partial A_k}\right|}{\max\left(\left|\frac{\partial y_{c,box\_pre}}{\partial A_k}\right|\right)} \quad \text{[Math. 3]}$$

In Step S107, the feature importance calculation unit 14 obtains the feature importance for each channel number from $G_{k, c, box\_pre}$ obtained in Step S106. The feature importance can be obtained, for example, by calculating an average of values of only a region near the prediction result in $G_{k, c, box\_pre}$, calculating an average of only values equal to or more than a threshold value set in advance, or the like. The feature importance can be obtained for each channel number by the above process. Thus, for example, when the number of channels is 100, 100 pieces of feature importance are obtained. When a plurality of defects appear in the pickup image 1 and there are a plurality of prediction results, the feature importance is obtained for each prediction result.

In Step S108, the feature importance calculation unit 14 sorts the feature importance obtained in Step S107 in descending order of values, and determines A (first number) pieces of important channels for the prediction result (the class is c, and the position is box_pre). When a plurality of defects appear in the pickup image 1 and there are a plurality of prediction results, the above process is performed for each prediction result.

Figures 5, 6:
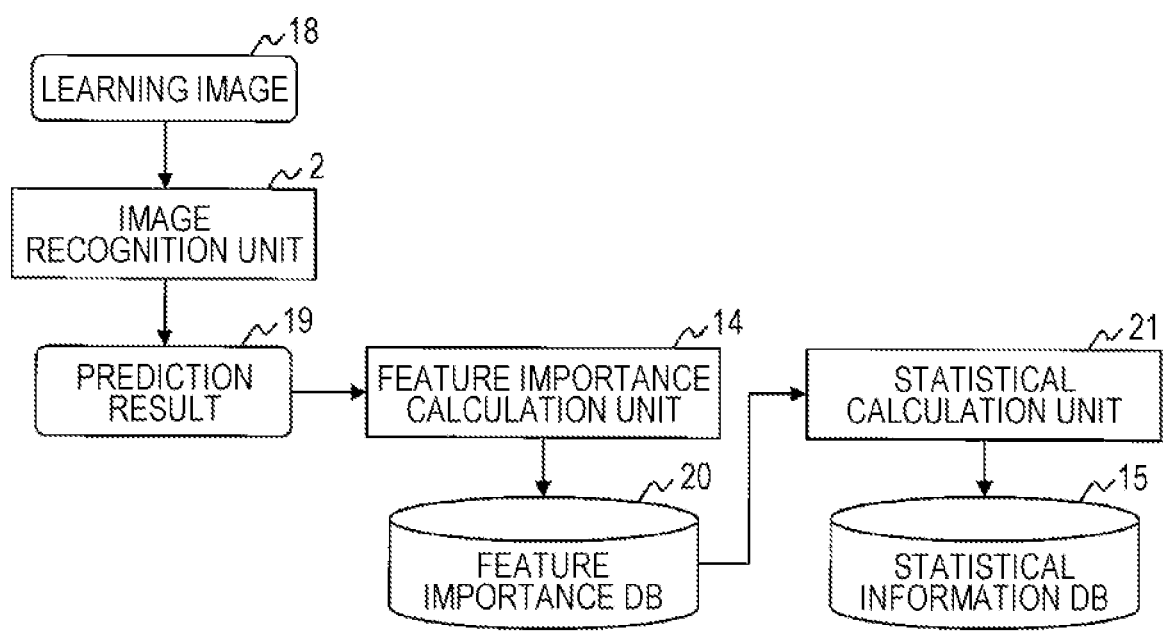
FIG. 5 illustrates an example of a result obtained by the feature importance calculation unit.
FIG. 6 is a block diagram illustrating the configuration of the image recognition system.

FIG. 5 illustrates an example of a result obtained by the feature importance calculation unit 14. As illustrated in FIG. 5, A pieces of important channels for the prediction result are obtained by Steps S105 to S108.

How to obtain the statistic stored in the statistical information database (DB) 15 will be described with reference to FIGS. 6 to 8.

FIG. 6 is a block diagram illustrating the configuration of the image recognition system 100. The image recognition system 100 may include a feature importance database (DB) 20 in addition to the configuration described with reference to FIG. 2.

The image recognition unit 2 performs prediction on a learning image 18 and outputs a prediction result 19. The learning image 18 is an image used in learning of the image recognition unit 2. A portion of an image used for learning may be used as the learning image 12.

The feature importance calculation unit 14 calculates feature importance for the prediction result 19 and stores the result in the feature importance database (DB) 20.

The statistic calculation unit 21 calculates a statistic from the result stored in the feature importance database (DB) 20 and stores the result in the statistical information database (15). A specific example of the statistic will be described later.

Figure 7:
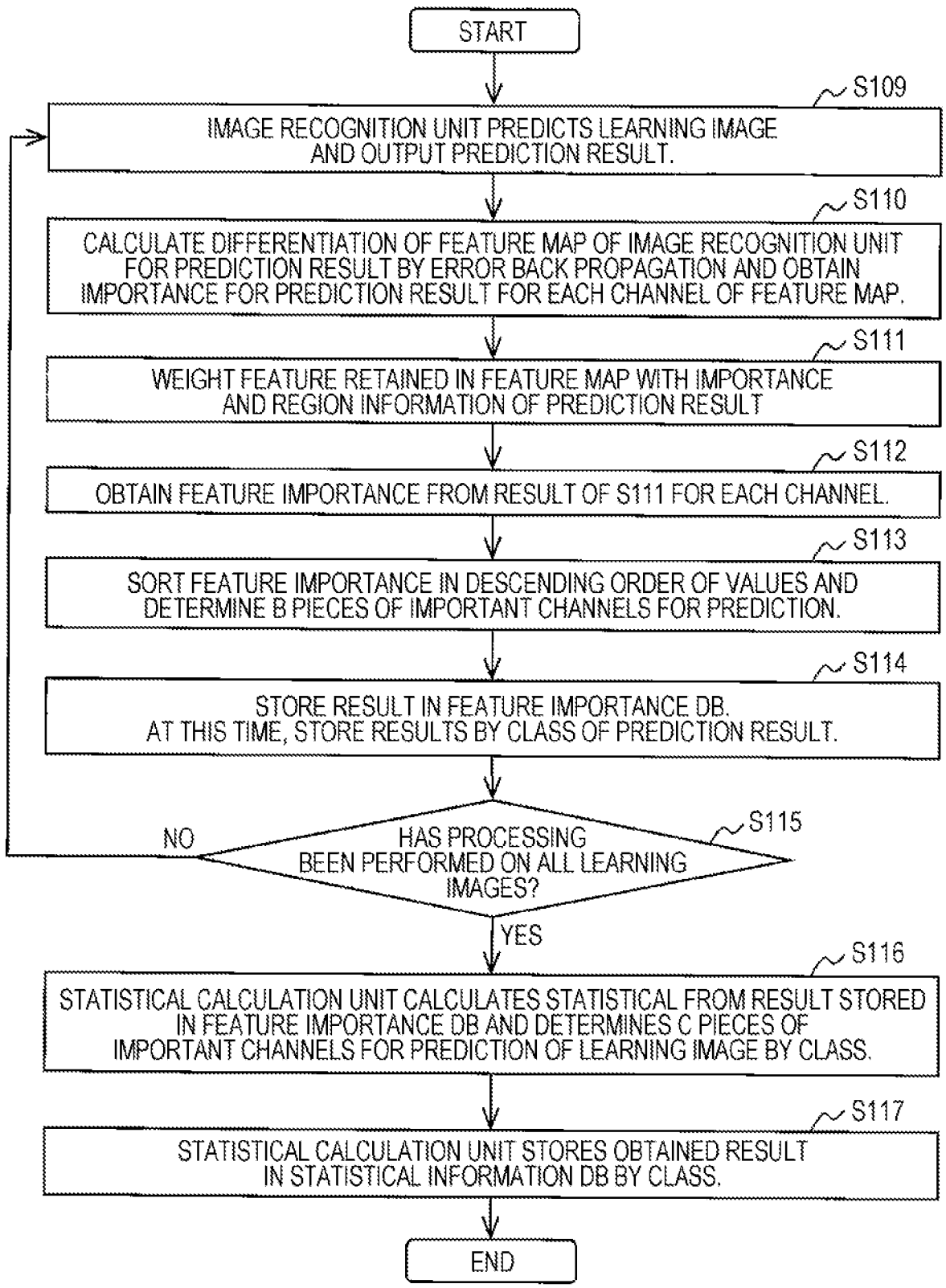
FIG. 7 is a flowchart illustrating a procedure in which a statistic calculation unit obtains a statistic.

FIG. 7 is a flowchart illustrating a procedure in which the statistic calculation unit 21 obtains the statistic. Each step in FIG. 7 will be described below.

In Step S109, the image recognition unit 2 performs prediction on a learning image 18 and outputs a prediction result 19.

In Step S110, the feature importance calculation unit 14 calculates the differentiation of the feature map of the image recognition unit 2 for the prediction result 19 by error back propagation, and obtains the importance for the prediction result 19 for each channel of the feature map. The calculation procedure is the same as that in S105.

In Step S111, the feature importance calculation unit 14 weights the feature held in the feature map with the importance and region information of the prediction result. The calculation procedure is the same as that in S106.

In Step S112, the feature importance calculation unit 14 obtains the feature importance for each channel from the result of Step S111. The calculation procedure is the same as that in S107.

In Step S113, the feature importance calculation unit 14 sorts the feature importance in descending order of values, and determines B (second number) pieces of important channels for the prediction result.

In Step S114, the feature importance calculation unit 14 stores the result in the feature importance database (DB) 20. At this time, the prediction result is stored for each class. An example of the result of this step will be described with reference to FIG. 8A.

In Step S115, it is determined whether or not the processing has been performed on all learning images. When the processing has been performed on all the learning images (YES), the process proceeds to Step S116. When the processing has not been performed on all the learning images (NO), the processing returns to Step S109, and the processes in and after Step S109 are performed again.

In Step S116, the statistic calculation unit 21 calculates a statistic from the result stored in the feature importance database (DB) 20, and determines C (third number) pieces of important channels statistically obtained for the prediction result of the learning image for each class. This is performed, for example, by determining top C pieces of channel numbers having a large number of times of entering within Rank B, for each class from the result stored in the feature importance database (DB) 20. An example of the result of this step will be described with reference to FIG. 8B.

In Step S117, the statistic calculation unit 21 stores the obtained result in the statistical information database (DB) 15 for each class.

FIG. 8A illustrates an example of data stored in the feature importance database (DB) 20 in S114. As illustrated in FIG. 8A, the B pieces of important channels obtained for each prediction result are stored for each class. In FIG. 8A, one table corresponds to one prediction result (that is, a result obtained by identifying one defect).

FIG. 8B illustrates an example of data stored in the statistical information database (DB) 15 in S116. As illustrated in FIG. 8B, the C pieces of important channels obtained from the feature importance database (DB) 20 are stored for each class.

The comparison unit 16 determines the correctness of the prediction result by comparing the feature importance obtained by the feature importance calculation unit 14 with the statistic related to the feature importance stored in the statistical information database (DB) 15. When the prediction class is X, the comparison unit 16 compares the A pieces of important channels for the prediction result, which are obtained by the feature importance calculation unit 14, with the C pieces of important channels corresponding to the class X, which are stored in the statistical information database (DB) 15. Regarding the correctness determination of the prediction result, for example, if N pieces (threshold value) or more of the A pieces of important channels, which are obtained by the feature importance calculation unit 14 are included in the C pieces of important channels stored in the statistical information database (DB) 15, the comparison unit 16 determines that the prediction result is correct. If the N pieces (threshold value) or more are not included in the C pieces of important channels, the comparison unit 16 determines that the prediction result is incorrect.

FIG. 9 is a diagram conceptually illustrating the correctness determination of the prediction result by comparison of a distribution. The comparison unit 16 may determine the correctness of the prediction result by comparing the distribution of the feature importance with the statistical distribution of the feature importance. In this case, the feature importance calculation unit 14 obtains the channel number for the prediction result and a distribution related to the feature importance. The statistic calculation unit 21 stores the statistical distribution related to the channel number and the feature importance for the prediction result of the learning image in the statistical information database (DB) 15 for each class. The comparison unit 16 calculates a distance between the distribution obtained by the feature importance calculation unit 14 with respect to the prediction result and the statistical distribution stored in the statistical information database (DB) 15. When the distance is equal to or less than a threshold value D, the comparison unit 16 determines that the prediction result is correct. When the distance is not equal to or less than the threshold value D, the comparison unit 16 determines that the prediction result is incorrect. The distance between the distributions is measured by, for example, L1 distance, L2 distance, Kullback-Leibler (KL), or the like.

First Embodiment: Summary

According to the first embodiment, the image recognition system 100 calculates the feature importance for each target shape and for each feature type, by using a parameter representing the magnitude of the influence of the image feature on the recognition result. Furthermore, the correctness of the recognition result is determined by comparing the feature importance with the statistic thereof. Since the feature importance and the statistic are compared with each other for each target shape, it is possible to determine the correctness of the recognition result for each target shape even when a plurality of target shapes appear in the image.

According to the first embodiment, the image recognition system 100 calculates the feature importance for each target shape and for each feature type, by using a parameter representing the magnitude of the influence of the image region on the recognition result. Thus, even when the target shapes are dispersed in portions in the image, it is possible to determine the correctness of the recognition result for each target shape.

Second Embodiment

Figure 10:
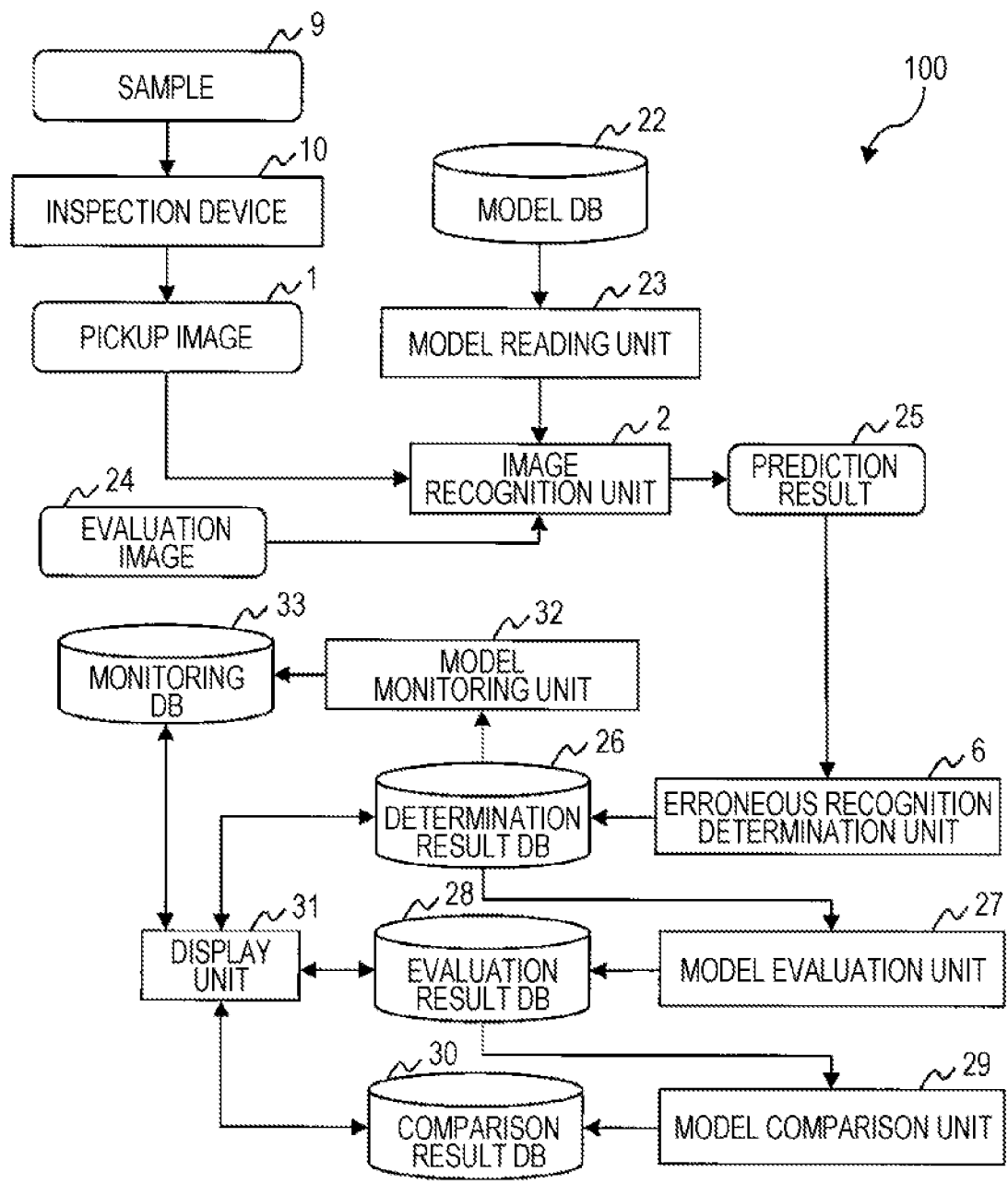
FIG. 10 is a block diagram illustrating a configuration of an image recognition system according to a second embodiment.

FIG. 10 is a block diagram illustrating a configuration of an image recognition system 100 according to a second embodiment of the present invention. In the second embodiment, the image recognition model is evaluated or compared based on the result of the erroneous recognition determination unit 6.

A model database (DB) 22 is a database that stores a plurality of image recognition models learned by changing teacher data, learning conditions, and the like.

A model reading unit 23 selects a model from the model database (DB) 22 and reads the model into the image recognition unit 2.

An evaluation image 24 is an image for evaluating the model and is unlabeled data. Regarding the evaluation image, for example, an appropriate image is collected from an image picked up by the inspection device.

A determination result database (DB) 26 is a database that stores the determination result by the erroneous recognition determination unit 6.

A model evaluation unit 27 evaluates the performance of the model read into the image recognition unit 2 from the result stored in the determination result database (DB) 26, and stores the evaluation result in an evaluation result database (DB) 28.

A model comparison unit 29 compares and evaluates the models from the results stored in the evaluation result database (DB) 28, and stores the result in a comparison result database (DB) 30.

A model monitoring unit 32 monitors the model from the result stored in the determination result database (DB) 26 and stores the result in a monitoring database (DB) 33. Details of the model monitoring unit 32 and the monitoring database (DB) 33 will be described in an embodiment described later.

A display unit 31 is a display device that displays an erroneous recognition determination result, a model evaluation result, a model comparison result, and a model monitoring result. The display unit 31 can also display each graphical user interface (GUI) described later.

Figure 11:
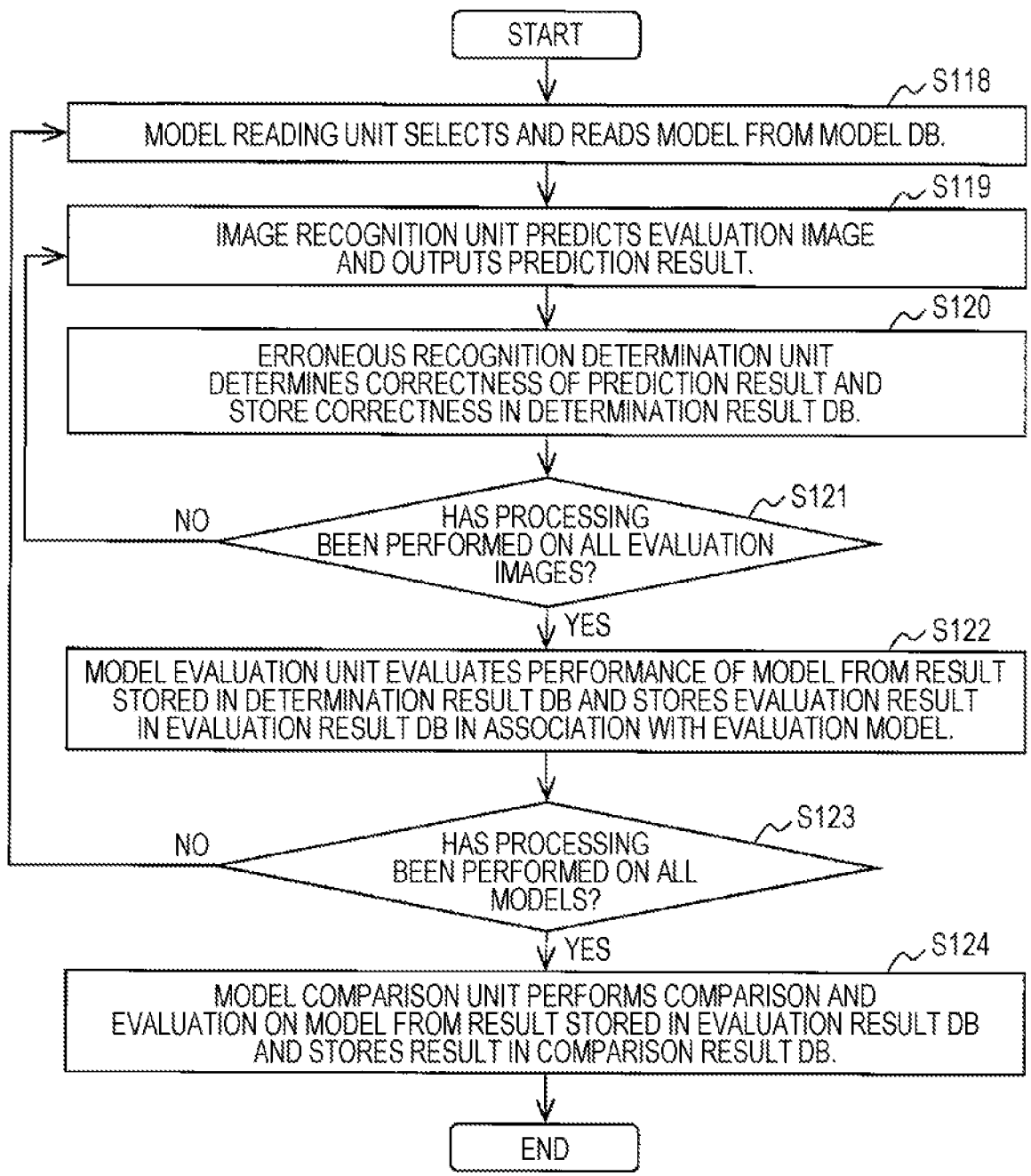
FIG. 11 is a flowchart illustrating an operation of the image recognition system in the second embodiment.

FIG. 11 is a flowchart illustrating an operation of the image recognition system 100 in the second embodiment. Each step in FIG. 11 will be described below.

In Step S118, the model reading unit 23 selects and reads a model from the model database (DB) 22. The image recognition unit 2 acquires the model.

In Step S119, the image recognition unit 2 performs prediction on an evaluation image 24 and outputs a prediction result 25.

In Step S120, the erroneous recognition determination unit 6 determines the correctness of the prediction result 25 and stores the result in the determination result database (DB) 26.

In Step S121, it is determined whether or not the processing has been performed on all evaluation images. When the processing has been performed on all the evaluation images (YES), the process transitions to Step S122. When the processing has not been performed on all the evaluation images (NO), the processing returns to Step S119, and the processes in and after Step S119 are performed again.

In Step S122, the model evaluation unit 27 evaluates the performance of the model from the result stored in the determination result database (DB) 26, and stores the evaluation result in the evaluation result database (DB) 28 in association with an evaluation model.

In Step S123, it is determined whether or not the processing has been performed on all models stored in the model database (DB) 22. When the processing has been performed on all the models (YES), the process transitions to Step S124. When the processing has not been performed on all the models (NO), the process returns to S118.

In Step S124, the model comparison unit 29 compares and evaluates the models from the results stored in the evaluation result database (DB) 28, and stores the result in the comparison result database (DB) 30.

Figure 12:
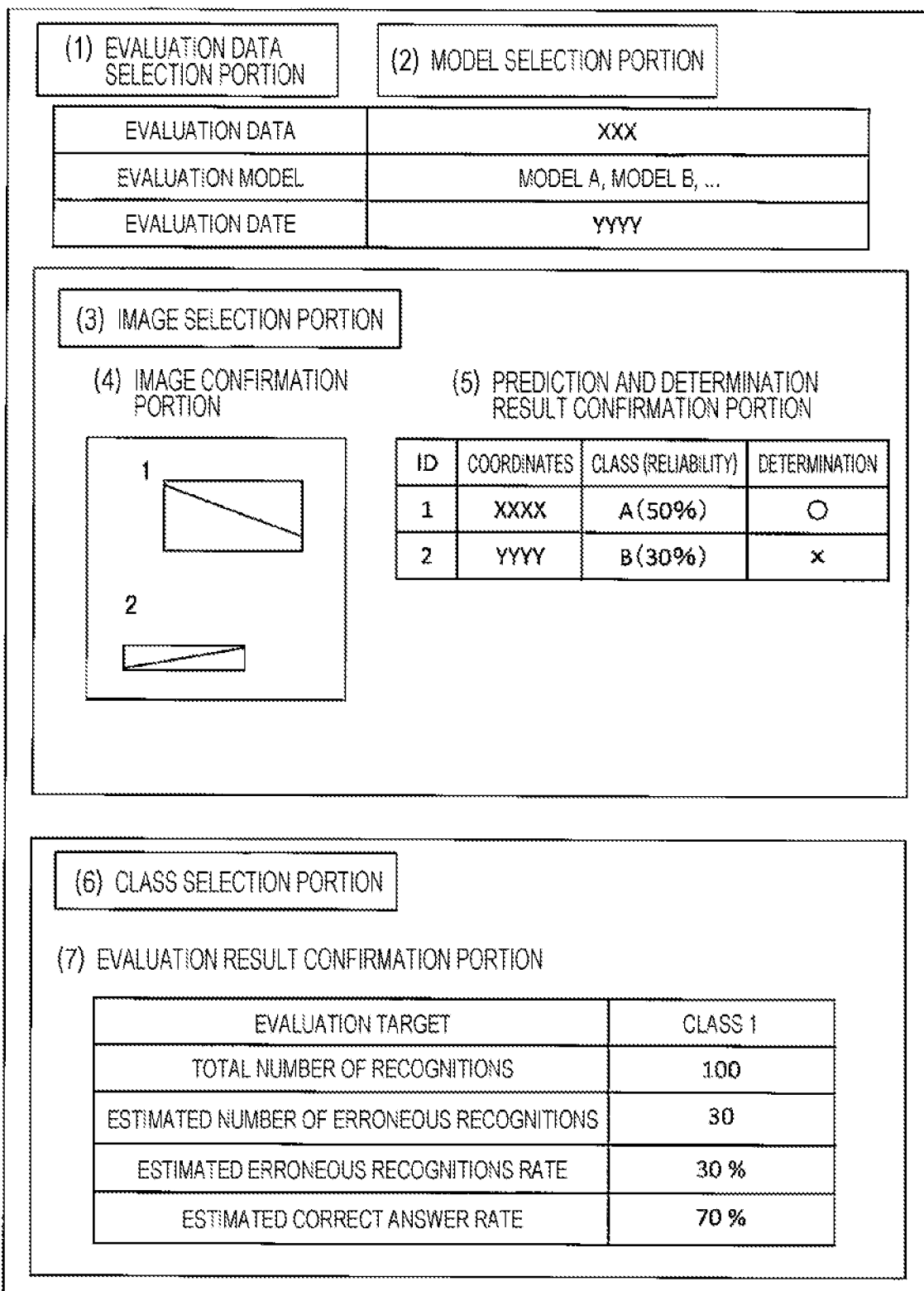
FIG. 12 illustrates an example of a GUI that displays an erroneous recognition determination result stored in a determination result database (DB) and a model evaluation result stored in an evaluation result database (DB)

FIG. 12 illustrates an example of a GUI that displays the erroneous recognition determination result stored in the determination result database (DB) 26 and the model evaluation result stored in the evaluation result database (DB) 28. As illustrated in FIG. 12, the GUI displays (1) an evaluation data selection portion, (2) a model selection portion, (3) an image selection portion, (4) an image confirmation portion, (5) a prediction and determination result confirmation portion, (6) a class selection portion. (7) an evaluation result confirmation portion, and the like.

Evaluation data is selected in (1) the evaluation data selection portion, and a model is selected in (2) the model selection portion.

In (5) the prediction and determination result confirmation portion, a prediction result of the image recognition unit 2 for an image that is selected in (3) the image selection portion and is displayed in (4) the image confirmation portion, and a determination result of the correctness determination on the prediction result by the erroneous recognition determination unit 6 are displayed.

In (7) the evaluation result confirmation portion, an evaluation result by the model evaluation unit 27 is displayed. As an evaluation index, for example, a total number of recognitions, an estimated number of erroneous recognitions, an estimated erroneous recognition rate, an estimated correct answer rate, or the like are provided. The evaluation result for each class can be displayed in (6) the class selection portion.

FIG. 13 illustrates an example of a GUI that displays the comparison result stored in a comparison result database (DB) 30. As illustrated in FIG. 13, the GUI displays (1) an evaluation data selection portion, (2) a comparison condition setting portion, (3) a comparison result confirmation portion, and the like.

Evaluation data is selected in (1) the evaluation data selection portion.

In (2) the comparison condition setting portion, a specific setting is made when the model is compared and evaluated. For example, an index to be compared as a comparison target, model reliability, or the like is set. The model reliability is an index quantitatively indicating "certainty" for the prediction result of the image recognition model. The larger the value, the higher the probability of the prediction result.

A comparison result for a plurality of models is displayed in (3) the comparison result confirmation portion in a condition set in (2) the comparison condition setting portion. For example, an optimum model when evaluation is performed for each class with the comparison target is displayed.

Third Embodiment

Figure 14:
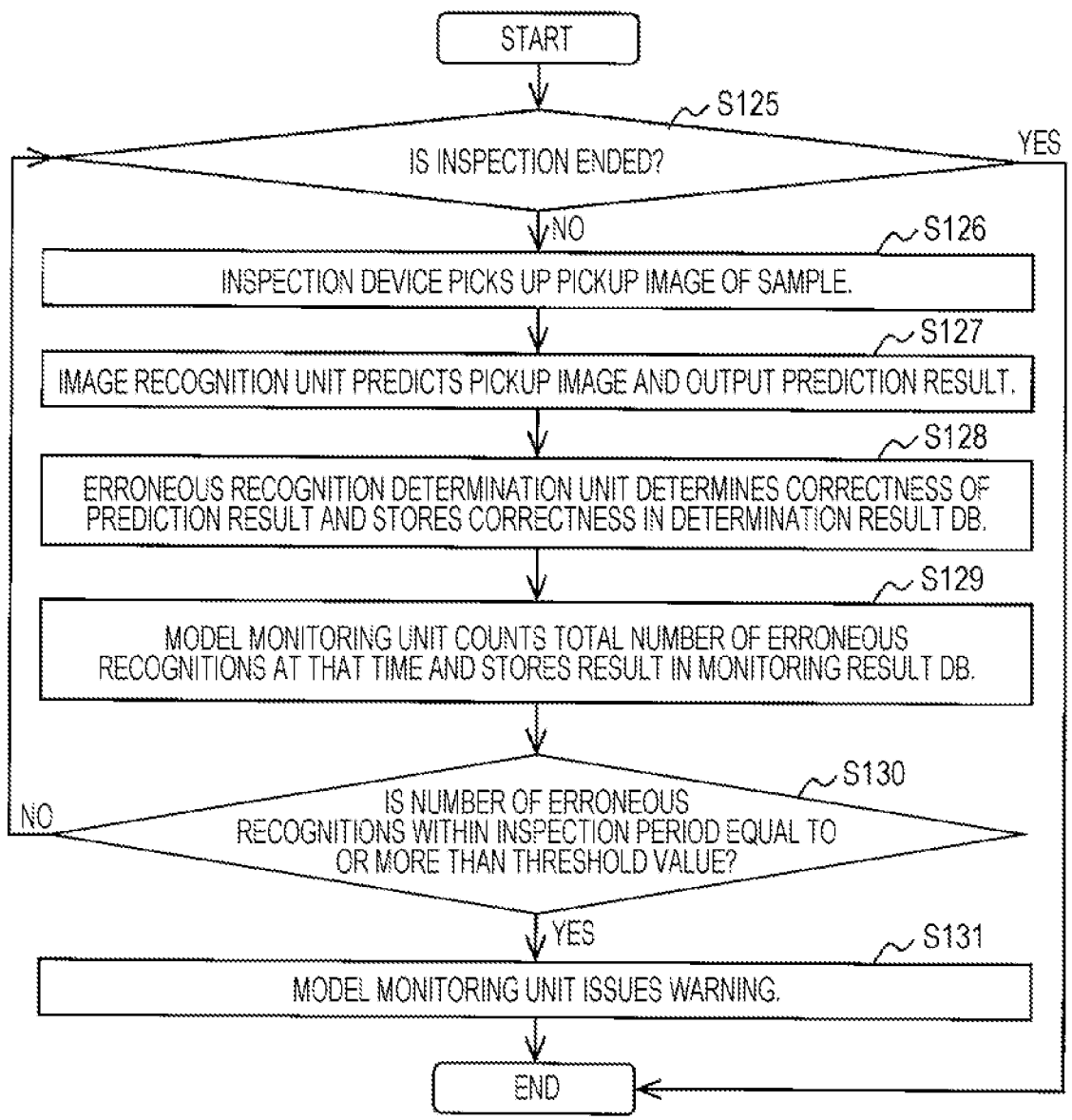
FIG. 14 is a flowchart illustrating an operation of an image recognition system according to a third embodiment.

FIG. 14 is a flowchart illustrating an operation of an image recognition system 100 according to a third embodiment of the present invention. In the third embodiment, the state of the model is monitored based on the determination result of the erroneous recognition determination unit 6. The configuration of the image recognition system 100 is similar to that in the second embodiment.

In Step S125, it is determined whether or not the inspection is ended. When the inspection is ended (YES), the present flowchart is ended. When the inspection is not ended (NO), the process transitions to Step S126.

In Step S126, the inspection device 10 picks up a pickup image 1 of a sample 9.

In Step S127, the image recognition unit 2 performs prediction on the pickup image 1 and outputs a prediction result 25.

In Step S128, the erroneous recognition determination unit 6 determines the correctness of the prediction result 25 and stores the result in the determination result database (DB) 26.

In Step S129, the model monitoring unit 32 counts the total number of erroneous recognitions at this time, and stores the result in the monitoring database (DB) 33. The model monitoring unit 32 may obtain an estimated erroneous recognition rate, an estimated correct answer rate, and the like from the total number of recognitions and the total number of erroneous recognitions.

In Step S130, it is determined whether or not the number of erroneous recognitions within an inspection period is equal to or more than a threshold value. When the number of erroneous recognitions within the inspection period is equal to or more than the threshold value (YES), the process transitions to Step S131, and the model monitoring unit 32 issues a warning. When the number of erroneous recognitions within the inspection period is not equal to or more than the threshold value (NC)), the process returns to Step S125, and the processes after Step S125 are performed again. The determination may be made based on, for example, that the estimated erroneous recognition rate within the inspection period is equal to or more than a threshold value, that the estimated correct answer rate within the inspection period is equal to or less than a threshold value, and the like.

FIG. 15 illustrates an example of a GUI output by the display unit 31. FIG. 15 illustrates a display example of the result stored in the monitoring database (DB) 33 in the GUI. As illustrated in FIG. 15, the GUI displays (1) a period selection portion, (2) a monitoring result confirmation portion, and the like.

The result stored in the monitoring database (DB) 33 is displayed in (2) the monitoring result confirmation portion. As illustrated in FIG. 15, for example, a graph in which the horizontal axis represents the inspection period and the vertical axis represents the estimated number of erroneous recognitions or the estimated erroneous recognition rate is displayed. The inspection period on the horizontal axis can be changed in (1) the period selection portion. In the example in FIG. 15, the estimated erroneous recognition rate is aggregated every month. When the estimated erroneous recognition rate is more than a setting value set in advance, the model monitoring unit 32 issues a warning.

MODIFICATION EXAMPLES OF PRESENT INVENTION

The present invention is not limited to the above described embodiments, and various modification examples may be provided. For example, the above embodiments are described in detail in order to aid in understanding the present invention, and are not necessarily limited to a case including all the described components. Further, some components in one embodiment can be replaced with the components in another embodiment, and the configuration of another embodiment can be added to the configuration of one embodiment. Regarding some components in the embodiments, other components can be added, deleted, and replaced.

In the above embodiments, it has been described that the image recognition unit 2 outputs the type (class) and the position of the defect, as the prediction result. The image recognition system 100 in the present invention is also applicable to a case where the image recognition unit 2 performs class classification for each pixel of the input image (segmentation). In this case, for example, a segment region obtained from the prediction result of the image recognition unit 2 is set as a designated region and is used as the input of the erroneous recognition determination unit 6.

In the above embodiments, the present invention can also be applied to an image recognition system that recognizes a shape other than a defect when the shape is shifted in an image. That is, the present invention can be applied to a general system that recognizes the type and the position of an object in an image.

In the above embodiments, an image (typical image) of a sample to be inspected may be acquired in advance, and the correctness of the prediction result may be determined by comparing the prediction result of the image recognition unit 2 with the typical image.

In the above embodiments, for example, the feature importance calculation unit 14 can obtain the feature importance by performing the processing illustrated in FIG. 4 on a class score of the representative pixel in the region designated by a user. The representative pixel is determined, for example, by selecting a pixel having the highest class score in an input region. The statistic calculation unit 21 obtains a statistic related to the feature importance in accordance with the flow illustrated in FIG. 7 for each designated region of the prediction result for the image used in learning of the image recognition unit. With the above processing, the erroneous recognition determination unit 6 can determine the correctness of the prediction result for each designated region in the prediction result of the image recognition unit 2, and can perform model evaluation, model comparison, and model monitoring based on the result.

In the above embodiments, the coefficient α in Math. 2 may be omitted, and G may be calculated only by A and S. According to the experiments of the present inventors, it is additionally noted that the accuracy of correct/incorrect determination was sufficient even in this case.

In the above embodiments, each functional unit (mage recognition unit 2, erroneous recognition determination unit 6, statistic calculation unit 21, model reading unit 23, model evaluation unit 27, model comparison unit 29, display unit 31, model monitoring unit 32) in the image recognition system 100 can be configured by hardware such as a circuit device in which the function is implemented, or can be configured by an arithmetic device (for example, a central processing unit) executing software in which the function is implemented.

In the above embodiments, each database can be configured by storing a data file for recording a record in a storage device. A database management function of accessing the database may be implemented by each functional unit in the image recognition system 100, or a database management system may be separately provided to access the record via the database management system.

In the above embodiments, the inspection device 10 may be configured as a portion of the image recognition system 100, and the image recognition system 100 may be configured as a device independent of the inspection device 10.

What is claimed is:

1. An image recognition system that recognizes a shape included in an image, the image recognition system comprising:
   an image recognition unit that extracts a feature from an input image based on a result of performing machine learning, and recognizes a target shape included in the input image by using the feature; and
   an erroneous recognition determination unit that determines correctness of a recognition result by the image recognition unit,
   wherein the erroneous recognition determination unit comprises:
     a feature importance calculation unit that calculates an importance of the feature;
     a statistical information database that stores a statistic related to the importance; and
     a comparison unit that determines the correctness of the recognition result by comparing the importance with the statistic,
   the feature importance calculation unit calculates the importance for each target shape recognized by the image recognition unit and for each type of the feature, by
     using a feature importance parameter representing a magnitude of an influence of the feature when the image recognition unit recognizes the target shape, and
     using a region importance parameter representing a magnitude of an influence of an image region in the input image when the image recognition unit recognizes the target shape, in addition to the feature importance parameter,
   the statistical information database stores the statistic for each type of the target shape and for each type of the feature, and
   the comparison unit determines the correctness of the recognition result for each target shape recognized by the image recognition unit, by comparing, for each target shape recognized by the image recognition unit, the importance calculated by the feature importance calculation unit for each type of the feature with the statistic stored in the statistical information database for each type of feature.

2. The image recognition system according to claim 1, wherein
   the feature importance calculation unit calculates the feature importance parameter by using a ratio of an increment of a reliability score of the recognition result to an increment of the feature for each pixel position of the input image.

3. The image recognition system according to claim 1, wherein
the feature importance calculation unit calculates the region importance parameter by obtaining, for each image region, a ratio between a differential value obtained by differentiating a reliability score of the recognition result with the feature, and a maximum value of the differential value in the input image.

4. The image recognition system according to claim 1, further comprising a statistic calculation unit that creates the statistical information database,
wherein the statistic calculation unit creates a first list in which a first number of types of the features is listed in a descending order of the importance for each target shape recognized by the image recognition unit,
the statistic calculation unit stores a second list in which a second number of types of the features is listed in a descending order of a frequency included in the first list in the statistical information database as the statistic, for each target shape recognized by the image recognition unit,
the feature importance calculation unit creates a third list in which a third number of types of the features is listed in the descending order of the importance for each target shape recognized by the image recognition unit, and
the comparison unit determines that the recognition result for the target shape is correct when the second list includes a threshold number or more of the types of the features listed in the third list, and determines that the recognition result is incorrect when the second list does not include the threshold number or more of the types of the features listed in the third list.

5. The image recognition system according to claim 1, further comprising a statistic calculation unit that creates the statistical information database,
wherein the feature importance calculation unit creates a first distribution that describes the type of the feature and a distribution of the importance, for each target shape recognized by the image recognition unit,
the statistic calculation unit creates a second distribution that describes the type of the feature and the distribution of the importance, for each type of the target shape recognized by the image recognition unit,
the comparison unit calculates a distance between the first distribution and the second distribution, and
the comparison unit determines that the recognition result for the target shape is correct when the distance is equal to or less than a threshold value, and determines that the recognition result is incorrect when the distance is not equal to or less than the threshold value.

6. The image recognition system according to claim 1, further comprising:

a determination result database that stores a recognition result by the image recognition unit or a determination result by the erroneous recognition determination unit for one or more input images;
an evaluation result database that stores a result obtained by evaluating performance of the image recognition unit; and
a model evaluation unit that evaluates the performance of the image recognition unit from a result stored in the determination result database and stores an evaluation result in the evaluation result database.

7. The image recognition system according to claim 6, further comprising:
a model database that stores one or more image recognition models in which machine learning for recognizing a shape included in an image has been performed in advance;
a model reading unit that causes the image recognition unit to read the image recognition model stored in the model database; and
a model comparison unit that evaluates the image recognition model based on one or more evaluation results stored in the evaluation result database,
wherein the erroneous recognition determination unit stores the determination result in the determination result database in association with the image recognition model, and
the model evaluation unit stores the evaluation result in the evaluation result database in association with the image recognition model.

8. The image recognition system according to claim 6, further comprising a model monitoring unit that determines whether or not the image recognition unit is performing an abnormal operation, based on the determination result stored in the determination result database, and outputs a warning indicating that the image recognition unit is performing the abnormal operation, when the image recognition unit is performing the abnormal operation.

9. The image recognition system according to claim 1, wherein the image recognition unit recognizes the target shape by machine learning using a convolutional neural network.

10. The image recognition system according to claim 1, wherein the image recognition unit recognizes a type and a position of an object appearing in the input image, based on the target shape.

11. The image recognition system according to claim 1, wherein the erroneous recognition determination unit determines correctness of the recognition result by the image recognition unit, by comparing a typical image input in advance with the input image.

* * * * *